(12) United States Patent
Kucza et al.

(10) Patent No.: US 6,451,453 B1
(45) Date of Patent: Sep. 17, 2002

(54) ALUMINUM ALLOY STRIP OR TUBE FOR THE MANUFACTURE OF BRAZED HEAT EXCHANGERS

(75) Inventors: Jean-Claude Kucza, Saint Etienne de Crossey; Ravi Shahani, Coublevie; Bruce Morere, Voiron; Jean-Luc Hoffmann, Matzenheim, all of (FR)

(73) Assignee: Pechiney Rhenalu, Paris (FR)

( * ) Notice: Subject to any disclaimer, the term of this patent is extended or adjusted under 35 U.S.C. 154(b) by 98 days.

(21) Appl. No.: 09/620,597

(22) Filed: Jul. 20, 2000

(30) Foreign Application Priority Data

Aug. 12, 1999 (FR) .............................. 99 10536

(51) Int. Cl.⁷ .............................. B32B 15/20; C22F 1/04
(52) U.S. Cl. ........................ 428/654; 138/140; 148/516; 148/519; 148/523; 148/535; 148/550; 148/552; 148/689; 148/692; 148/439; 165/905; 420/534; 420/535; 420/553; 428/606; 428/607; 428/577; 428/34.1; 428/933
(58) Field of Search ................ 428/654, 606, 428/607, 577, 34.1, 933; 138/140; 165/905; 420/548, 532, 534, 535, 537, 538, 553, 541, 544, 546, 547; 148/519, 516, 523, 535, 550, 552, 689, 692, 439

(56) References Cited

U.S. PATENT DOCUMENTS

| | | | |
|---|---|---|---|
| 4,649,087 A | 3/1987 | Scott et al. | 428/654 |
| 4,673,551 A * | 6/1987 | Sugiyama et al. | 420/535 |
| 5,041,343 A | 8/1991 | Fortin et al. | 428/654 |
| 5,125,452 A | 6/1992 | Yamauchi et al. | 165/905 |
| 5,422,191 A | 6/1995 | Childree | 428/654 |

FOREIGN PATENT DOCUMENTS

| | | |
|---|---|---|
| EP | 0718072 | 6/1996 |
| JP | 09268339 | 10/1997 |
| WO | 9422633 | 10/1994 |

* cited by examiner

Primary Examiner—Robert R. Koehler
(74) Attorney, Agent, or Firm—Dennison, Scheiner & Schultz

(57) ABSTRACT

Strip or drawn tube for the manufacture of a brazed heat exchanger, formed from an aluminum alloy containing Si, Cu and Mn, with optional amounts of Mg, Fe, Zn and Ti, where $Fe \leq Si$, and $Cu+Mg>0.4$. In the form of a strip, the alloy may be coated on one or both surfaces with an aluminum brazing alloy.

21 Claims, 3 Drawing Sheets

Before brazing    After brazing

ALUMINUM ALLOY STRIP OR TUBE FOR THE MANUFACTURE OF BRAZED HEAT EXCHANGERS

FIELD OF THE INVENTION

The invention relates to strips or thin drawn tubes (of thickness generally between 0.1 and 1.5 mm) made of aluminum-manganese alloy (3000 series according to the nomenclature of the Aluminum Association), possibly coated on one or two surfaces with a covering alloy, most commonly an aluminum-silicon brazing alloy (4000 series according to the nomenclature of the Aluminum Association). These strips and tubes are intended for the manufacture of elements, such as tubes, fins, collectors and plates, for heat exchangers assembled by brazing, these exchangers being used particularly in the cooling systems of engines and air-conditioning systems for the interiors of automobiles. The techniques for brazing aluminum alloys are described, for example, in the article by J. C. Kucza, and J. C. Goussain "Le brasage fort de l'aluminium et ses alliages", that appeared in Soudage et Techniques Connexes, November–December. 1991, pp. 18–29. The strips or tubes according to the invention are used notably in the brazing techniques with non-corrosive flux of the NOCOLOK® or CAB (Controlled Atmosphere Brazing) type.

DESCRIPTION OF RELATED ART

The use of aluminum alloys in heat exchangers of automobiles has developed during the last few years, notably because of the weight benefit that it provides compared with the use of copper based alloys. The required properties for strip or tubes made of aluminum alloy that are used for the manufacture of brazed exchangers are notably good brazeability, high mechanical strength after brazing, so that the thickness used is a small is possible, the tubes, fins, collectors and plates should be easy to form, and there should be good resistance to corrosion. Of course, it is important that the alloy chosen should be easy to cast and to roll or draw, and that the cost of producing strip or tubes should be compatible with the demands of the automobile industry.

The alloy currently used as a base alloy is 3003 of composition (% by weight according to Standard EN 573-3): Si<0.6 Fe<0.7 Cu: 0.05–0.20 Mn: 1.0–1.5 Zn<0.10 other elements each <0.05 and <0.15 in total; balance aluminum. Numerous alloys have been proposed in the course of the last few years to improve one or other of the using properties mentioned previously, in particular the corrosion resistance, from which comes the name "long-life" alloys which is sometimes given to them in the trade.

Patent FR 2564962 (=U.S. Pat. No. 4,673,551) from Sumitomo Light Metal Industries relates to a base alloy for fins for high pressure exchangers with the composition (% by weight):
Si: 0.05–0.30 Fe<0.8 Cu: 0.1–1 Mn: 0.6–1.5 Mg: 0.1–0.75 and possibly Zr, Ti, Cr or V at levels of <0.25%.

U.S. Pat. No. 5,125,452 (Sumitomo Light Metal Industries and Nippondenso) describes coated strip with the base alloy having the composition:
Si<0.1 Fe<0.3 Cu: 0.05–0.35 Mn: 0.3–1.5 Mg: 0.05–0.5 Ti: 0.05–0.35 with Cu−0.2<Mg<Cu+0.2.

Patent EP 0326337 (Alcan International) describes coated strip with the base alloy having the composition:
Si<0.15 Fe<0.4 Cu: 0.1–0.6 Mn: 0.7–1.5 Mg<0.8
The low Si content, preferably <0.05%, allows the formation of a dense layer of precipitates with Mn, which plays the role of a barrier to the diffusion of the silicon from the coating alloy, and increases the corrosion resistance. WO 94/22633 is a variant of the preceding patent which only differs in having a higher Cu content (0.6–0.9%).

U.S. Pat. No. 5,350,436 (Kobe Alcoa and Nippondenso) describes a base alloy of composition: Si: 0.3–1.3 Cu<0.2 Mn: 0.3–1.5 Mg<0.2 Ti: 0.02–0.3 Fe not being mentioned.

The high Si content (0.8% in the examples) permits one to compensate for the absence of Cu and Mg for mechanical strength. The presence of Ti and the absence of Mg contributes to good corrosion resistance.

Patent EP 0718072 (Hoogovens Aluminium Walzprodukte) describes a base alloy of composition:
Si<0.15 Fe<0.8 Cu: 0.2–2 Mn: 0.7–1.5 Mg: 0.1–0.6 with Cu+Mg<0.7 and a possible addition of Ti, Cr, Zr or V. The examples show Si contents of 0.5%.

To summarize what is known from the state of the technology for this type of alloy, a first category of alloys is noted which have a very low Si content (<0.15 and preferably <0.05%) and which may or may not have a Fe content which is low, but which, in all cases, is less strictly defined than the Si level. These very low Si levels can only be obtained by starting from pure bases, which has an adverse effect on the manufacturing costs. A second category of alloys, which calls into question the need for a very low Si content to obtain good corrosion, has, on the contrary, a rather high Si content (0.5 to 0.8%) possibly, in order to compensate for the loss of mechanical strength linked to low levels of hardening elements Mg and Cu. In effect, for brazing with a flux, it is known that the Mg content must be reduced, in order to prevent migration of Mg to the surface of the coating layer, which leads to the formation of a thick layer of oxide MgO. The presence of this oxide requires one to increase the quantity of flux on the surfaces to be brazed, which increases the costs of assembly and causes a deterioration in the appearance of the surface. As for Cu, its influence on corrosion resistance is much debated.

SUMMARY OF INVENTION

The applicant has determined a region of composition that allows one to further improve the compromise between the various using properties (mechanical strength, ductility, corrosion resistance and brazeability) while all the time remaining within acceptable economic constraints, by linking a narrow region of Si content situated between those disclosed in the two categories of alloys of the prior art, and a reduced level of Fe, which nevertheless remains at a reasonable level that does not require a pure base.

Hence, a subject of the invention is a strip or a thin drawn tube, intended for the manufacture of brazed heat exchangers, made of an alloy of composition (% by weight):
Si: 0.15–0.30 Fe<0.25 Cu: 0.2–1.1 Mn: 1.0–1.4 Mg<0.4 Zn<0.2 Ti<0.1 other elements each <0.05 and <0.15 in total, remainder aluminum with Fe≦Si and Cu+Mg>0.4.

This strip or this tube can be coated on one or both surfaces with an aluminum alloy, most commonly a AlSi brazing alloy containing from 5 to 13% of Si.

Another subject of the invention is 3 particular regions, within the general region of composition of the base alloy, that allow one to favor a particular property:
a) Cu: 0.2–0.6 Mg: 0.1–0.4
b) Cu: 0.6–1.1 Mg: 0.1–0.4
c) Cu: 0.4–0.7 Mg<0.01

DESCRIPTION OF THE PREFERRED EMBODIMENTS

Figure 1:
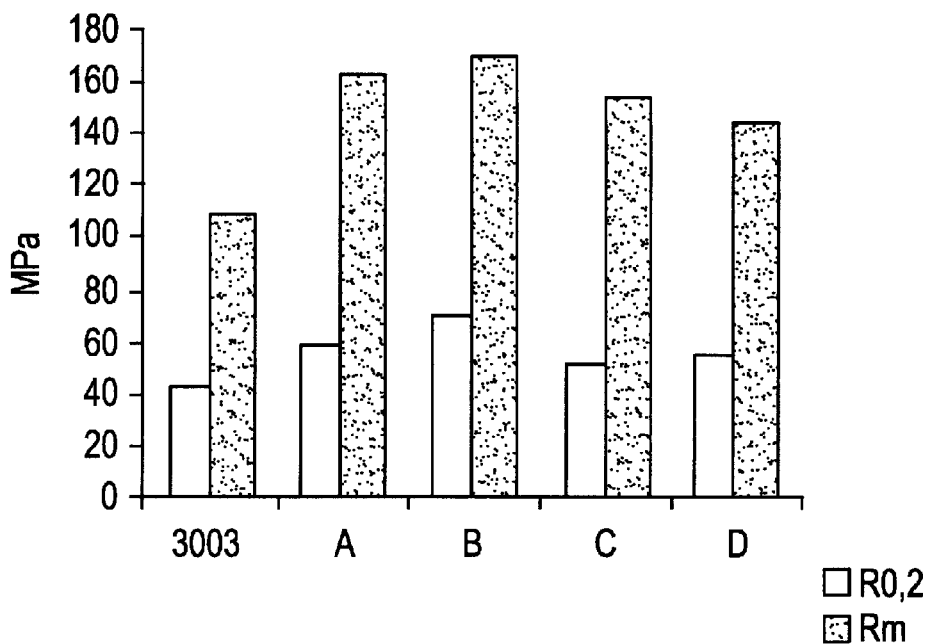
FIG. 1 represents the values of $R_{0.2}$ and $R_m$ in the annealed condition for the five alloys in the examples.

The strips or tubes according to the invention generally have a thickness of between 0.1 and 1.5 mm depending on the type of manufactured part, and can be coated with a covering alloy, which can be either a brazing alloy, or an alloy such as a zinc alloy like alloy 7072, that plays the role of sacrificial anode in order to protect the part from corrosion.

The composition limits of the base alloy can be justified in the following way. A minimum level of 0.15% allows one to avoid using a pure base, the cost of which is high. Furthermore, in alloys containing magnesium, silicon contributes to the mechanical strength by the formation of $Mg_2Si$ precipitates. Above 0.30%, silicon can have a damaging influence on the resistance to corrosion, and also on the formability, due to the formation of dispersoids AlMnSi and AlMnFeSi with manganese.

An iron content restricted to less than 0.25% is also favorable to corrosion resistance and formability, but it is not necessary to go down to very low levels such as <0.15% which would lead to high cost prices. Therefore the iron content must be kept equal to or less than the silicon content.

Copper is a hardening element which contributes to the mechanical strength, but above 1.1%, coarse intermetallic compounds are formed on casting which damage the homogeneity of the metal and constitute initiation sites for corrosion. With regard to the role of copper in corrosion resistance, the most recent work shows rather a favorable influence, while the copper remains in solid solution (cf. R. Benedictus et al., "Influence of alloying additions on corrosion behavior of aluminum brazing sheet", ICAA-6, 1998, pp. 1577–1582).

The manganese is within limits close to those for alloy 3003; it contributes to the mechanical strength and to the corrosion resistance, by increasing the difference in the electrochemical potential between the base alloy and the coating layer. As for all AlMn alloys, it is not possible to go beyond 1.4%, since the alloy can then no longer be easily cast.

Magnesium has a favorable effect on the mechanical strength. Contrary to this, it is damaging to the brazeability, to the extent that it migrates to the surface of the coating and, when brazing under vacuum, it causes an oxide layer to form which modifies the properties of the braze in an unfavorable way. For this reason, its content must be restricted to 0.4%. For very demanding applications, it may be necessary to totally do away with the magnesium. In this case one must have at least 0.4% copper in order to compensate for the loss of mechanical strength. In a general way, the sum of the Cu—Mg contents must be >0.4%.

A limited zinc addition may be beneficial to the corrosion resistance, by modifying the electrochemical parameters, especially in the case of high copper alloys. However, this addition must remain below 0.2% in order to avoid a too high susceptibility to generalized corrosion.

Titanium at a level of less than 0.1% is known to have a favorable influence on the corrosion resistance.

Within the composition region according to the invention, the Mg and Cu contents can be varied in order to favor one of the using properties. When magnesium is acceptable, less than 0.6% of copper can be included (while respecting the rule that Mg+Cu>0.4%) if one wishes to favor formability over mechanical strength for highly formed components, and more than 0.6% of copper in the contrary case.

For strip or tubes coated with a brazing alloy, this must have a liquidus temperature that is sufficiently low in relation to the base alloy to make available a temperature interval suitable for brazing, an acceptable mechanical strength and good wettability. Generate AlSi alloys are used that contain between 5 and 13% silicon, for example alloys 4004, 4104, 4045, 4047, 4343 and 4843. These alloys can contain additional elements, for example, strontium. One can also use as a coating, on one of the surfaces, an aluminum alloy with a sacrificial anode effect, notably an alloy containing zinc, such as alloy 7072. It is also possible to use multi-layered coatings. The thickness of the coated layer can vary between 0.01 and 0.2 mm and represents most commonly about 10% of the total thickness.

The method for producing strip consists of casting a plate of the base alloy and as required, one or two plates of the covering alloy, depending on whether one or both faces are to be coated. The assembly is hot rolled and then cold rolled to the desired thickness. When the purpose is to produce parts requiring a high degree of forming, the strip can be used in the annealed state (state O) by proceeding to a final annealing at a temperature between 320 and 380° C., continuously for the thicker strip, or in batches for the thinner strip. This annealing leads to recrystallization of the alloy and a microstructure with fine grains. In other cases it is used in the work hardened temper, which leads to better mechanical strength, for example an H14 or H24 temper (according to Standard NF EN 515), this latter temper being obtained through a recovery annealing treatment between 250 and 300° C., that avoids recrystallization.

Before setting up the coating material, one can carry out an homogenization of the plate of base alloy at a temperature of between 590 and 630° C. This homogenization is favorable to the ductility of the rolled strip and it is always carried out when the strip is used in the O state. It encourages coalescence of the dispersoids with the Mn and subsequently induces a recrystallization with equiaxial fine grains, which encourages the diffusion of the silicon from a brazing alloy to the numerous grain boundaries. This diffusion of the silicon can be unfavorable to the corrosion resistance of the brazed components and can, during the course of a brazing operation, lead to an impoverishment in input liquid required for good formation of brazed joints. Contrary to this, in the absence of homogenization and with a work hardened and recovered strip, after brazing, for strips according to the invention, one obtains a microstructure with elongated grains, which prevents the diffusion of silicon. It is preferable, in order to prevent diffusion of silicon to the grain boundaries, to have grains having a form factor F=maximum length/maximum width greater than 2.

The method of producing tubes comprises the casting of a billet, homogenization of this billet, the drawing of the tube and its drawing down to the desired dimensions. The tube can be used as drawn (H18 state) or annealed (O temper).

The strips and tubes according to the invention have, in comparison with the products of the prior art, a most favorable compromise between the various using properties, without any addition of production and implementation difficulties or any increase in production cost.

These strips and tubes can be used in the manufacture of radiators, notably for automobiles, such as radiators for cooling the engine, oil radiators, heating radiators and supercharging air radiators, as well as air-conditioning systems.

EXAMPLES 3 alloys A, B and C corresponding to base alloys according to the invention were cast as well as an alloy D according to the prior art and an alloy 3003. The compositions of the alloys are shown in Table 1:

TABLE 1

| Alloy | Si | Fe | Cu | Mn | Mg | Ti |
|---|---|---|---|---|---|---|
| A | 0.20 | 0.19 | 0.36 | 1.36 | 0.23 | 0.01 |
| B | 0.19 | 0.18 | 0.80 | 1.35 | 0.13 | 0.01 |
| C | 0.18 | 0.18 | 0.60 | 1.30 | 6 ppm | 0.008 |
| D | 0.04 | 0.17 | 0.25 | 1.10 | 0.18 | 0.03 |
| 3003 | 0.23 | 0.62 | 0.08 | 1.13 | 59 ppm | |

The five alloys were cast into plates, coated on one face with alloy 4343, hot rolled without prior homogenization and cold rolled to condition H24 (according to Standard NF EN 515) to a total thickness of 0.27 mm, with recovery annealing at 270° C., the brazing alloy representing about 10% of the thickness.

Figure 2:
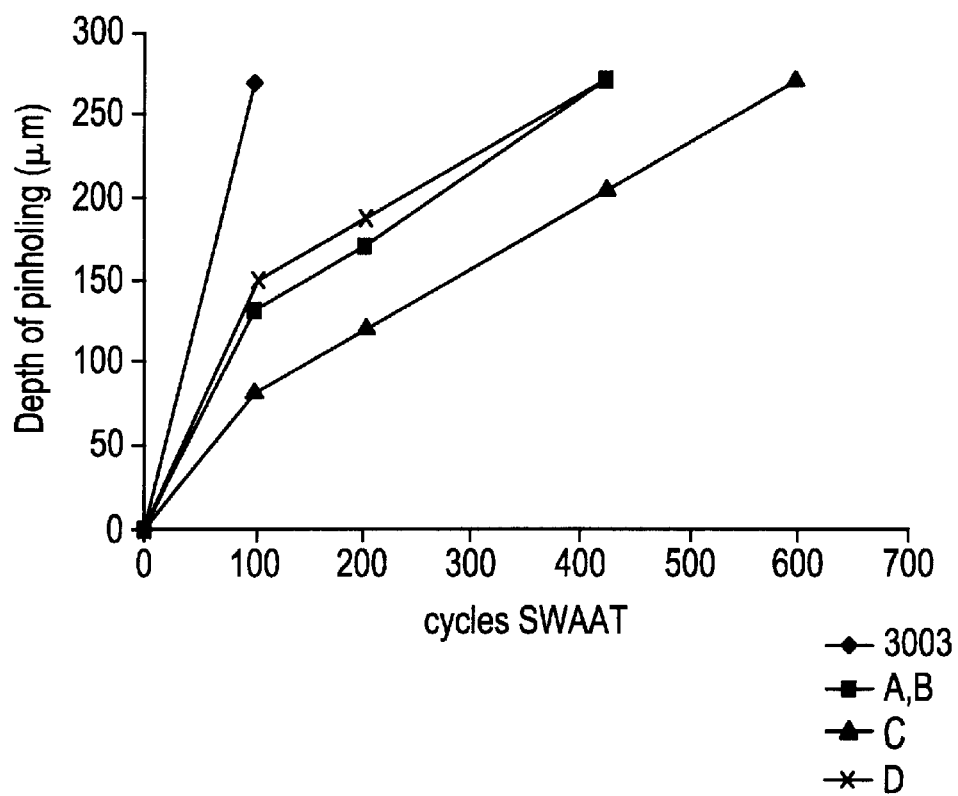
FIG. 2 represents the results of the SWAAT test for these alloys in the H24 condition.

The mechanical properties were measured (tensile strength Rm and elastic limit at 0.2% $R_{0.2}$ in MPa) and the depth of pinholing (in $\mu m$) using the SWAAT test (Salt Water Acetic Acid Test) according to the Standard ASTM G85. The results are shown in FIGS. 1 and 2.

The brazeability is measured with the help of two parameters: the width of the brazed joint (in $\mu m$) and the depth of dissolution (in $\mu m$), through a brazing test, described below, that simulates the brazing of a tube to a fin of an automobile heat exchanger. The brazeability is better as the width of the joint becomes greater, and as the depth of dissolution becomes less.

A "sandwich" test piece is made up of two coated sheets, of format 60×25 mm that tightly clamp a bare undulating fin with 10 undulations. The surfaces are degreased by thermal degreasing at 250° C. for 15 minutes. The three components are then clamped to one another under light pressure (0.1 to 0.2 MPa), and the assembled test piece is dipped in a solution of flux at a concentration of 10 to 30% in water, before being placed in a brazing oven at a temperature of 600° C. for five minutes.

Observations were made using an optical microscope of test pieces, previously cut width-wise, mounted and finely polished.

Figure 3:
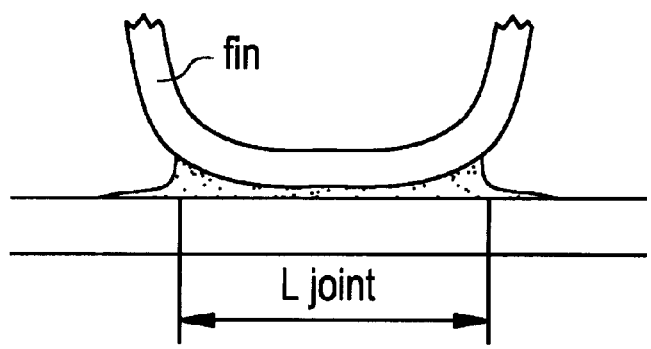
FIG. 3 shows how the width of the brazed joint is defined in the brazing aptitude test described in the examples.

Observation of the fillet of the assembly, as shown in FIG. 3, enables one to measure the width of the brazed joint.

The depth of dissolution is obtained by measuring, at an enlargement of between ×100 and ×400, the intergranular dissolution by the following method:

after micrographic polishing, a Keller attack is carried out in order to show up the microstructure (intermetallics and grain boundaries). This attacked surface shows the following features:

a) a rectilinear interface between the braze and the AlMnFeSi precipitates from the base alloy arising from transgranular type, homogeneous dissolution of the silicon in this base alloy, particularly visible in alloys with coarse grains, b) a winding interface arising from intergranular dissolution of the silicon, more visible in alloys with fine grains. It is this dissolution that is used as the basis of the measurement.

Figure 4:
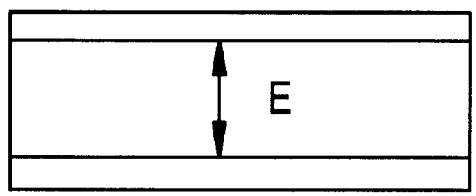
FIG. 4 represents diagrammatically a micrographic section of the brazed strip showing the parameters that are used to determine the depth of dissolution in the brazing test.
Figure 4:
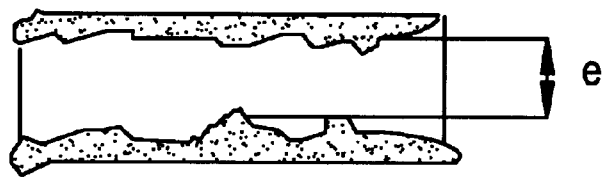
Figure 5:
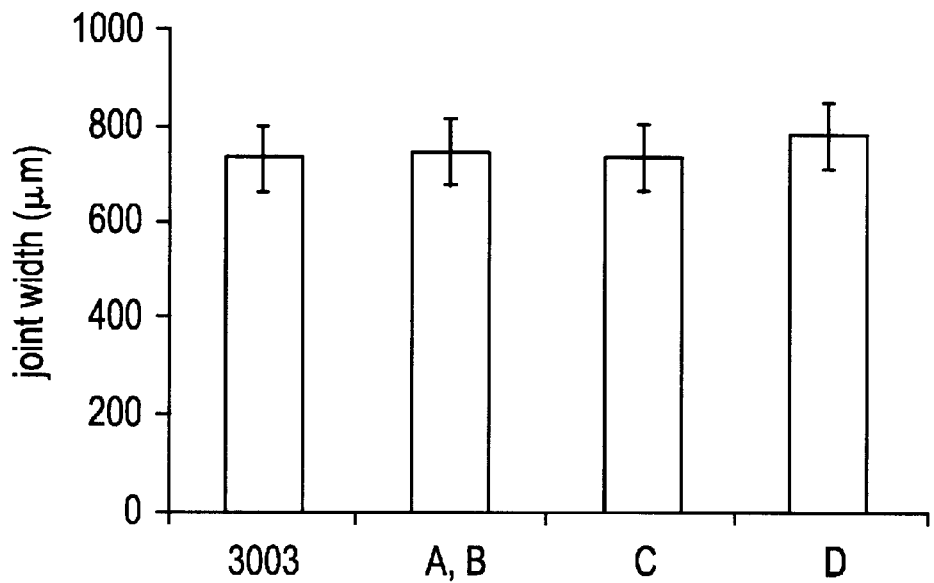
FIG. 5 shows the results relating to the width of the brazed joint.
Figure 6:
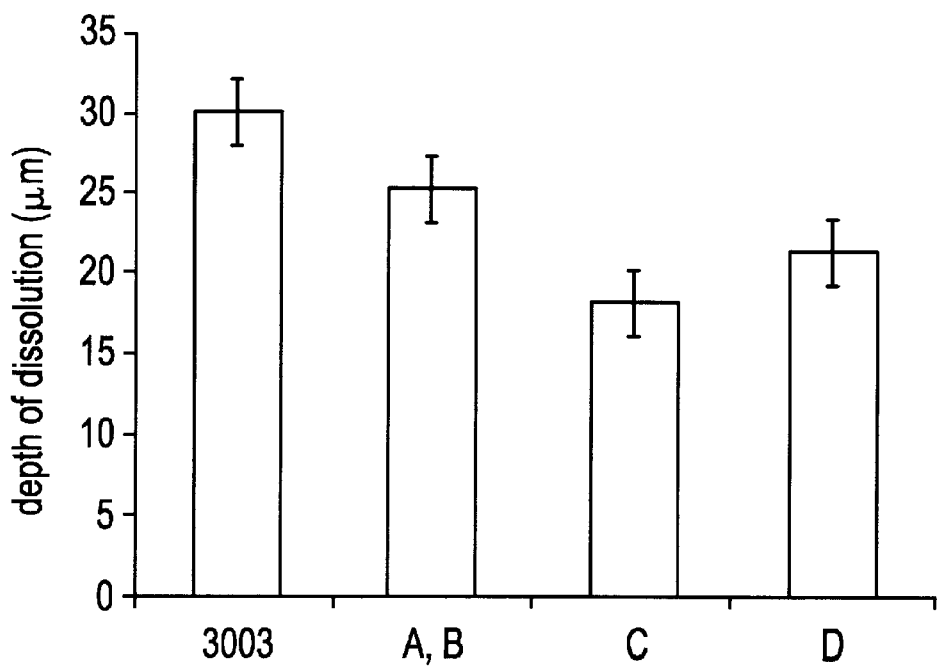
FIG. 6 shows the results relating to the depth of intergranular dissolution.

As shown in FIG. 4, the minimum thickness e between the winding interfaces of the input metal is measured and the depth of intergranular dissolution D is defined by the difference E−e, in which E is the thickness of the base alloy before brazing. In order to express the depth of dissolution for a strip coated on one face, the value D is divided by 2, by assuming that the process of dissolution is symmetrical for a strip coated on two faces. The values shown are the means of 10 measured values for one sample. The results relating to the width of the joint and to the depth of intergranular dissolution are shown respectively in FIGS. 5 and 6.

In comparison with alloy 3003, alloys A, B and C according to the invention offer improved mechanical characteristics, B showing better performance with a smaller pinhole depth, C being the best, with a brazed joint width that is roughly similar and a smaller depth of dissolution, above all for C.

In comparison with alloy D, Rm is always greater and, as for $R_{0.2}$, the values for A and B are greater while that for C is very slightly lower. The pinholing depth is smaller, especially for C. The width of the brazed joint is practically identical, and the depth of dissolution is reduced more for C, and is slightly greater for A and B. In this case the alloys according to the invention provide a compromise of properties that is more interesting, with furthermore, the possibility of choosing the property (mechanical strength more resistance to corrosion) that one wishes to favor. Finally, in contrast to D, the alloys of the invention do not require a very low silicon content which leads to higher production costs.

What is claimed is:

1. Strip or drawn tube for the manufacture of a brazed heat exchanger, comprising an aluminum alloy consisting essentially of, in % by weight:

Si: 0.15–0.30;
Fe: <0.25;
Cu: 0.6–1.1;
Mn: 1.0–1.4;
Mg: 0.1–0.4;
Zn: <0.2;
Ti: <0.1;
other elements: each <0.05 and total <0.15; and
Al: remainder;
wherein Fe≦Si, and Cu+Mg>0.4,
said strip having in a condition after brazing, a microstructure of elongated grains with a form factor F>2.

2. Strip according to claim 1, coated on at least one face thereof with an aluminum brazing alloy.

3. Strip according to claim 2, wherein the brazing alloy is an AlSi alloy containing 5 to 13 wt % Si.

4. Method of manufacturing a strip according to claim 1, comprising the steps of casting a plate of said aluminum alloy, hot rolling the cast plate without prior homogenization, cold rolling the hot rolled plate to a desired thickness, and recovery annealing of the cold rolled plate at a temperature of 250 to 300° C.

5. Strip or drawn tube for the manufacture of a brazed heat exchanger, comprising an aluminum alloy consisting essentially of, in % by weight:
Si: 0.15–0.30;
Fe: <0.25;
Cu: 0.6–1.1;
Mn: 1.0–1.4;
Mg: 0.1–0.4;
Zn: <0.2;
Ti: <0.1;
other elements: each <0.05 and total <0.15; and
Al: remainder;
wherein Fe≦Si, and Cu+Mg>0.4,
said strip having, in a condition after brazing, a microstructure of approximately equiaxial grains.

6. Strip according to claim 5, coated on at least one face thereof with an aluminum brazing alloy.

7. Strip according to claim 6, wherein the brazing alloy is an AlSi alloy containing 5 to 13 wt % Si.

8. Method of manufacturing a strip according to claim 5, comprising the steps of casting a plate of said aluminum alloy, homogenizing said plate between 590 and 630° C., hot rolling the homogenized plate, cold rolling the hot rolled plate to a desired thickness, and a final annealing at a temperature of 320 to 380° C.

9. Strip or drawn tube for the manufacture of a brazed heat exchanger, comprising an aluminum alloy consisting essentially of, in % by weight:
Si: 0.15–0.30;
Fe: <0.25;
Cu: 0.4–0.7;
Mn: 1.0–1.4;
Mg: <0.01;
Zn: <0.2;
Ti: <0.1;
other elements: each <0.05 and total <0.15; and
Al: remainder;
wherein Fe≦Si, and Cu+Mg>0.4.

10. Strip according to claim 9, coated on at least one face thereof with an aluminum brazing alloy.

11. Strip according to claim 10, wherein the brazing alloy is an AlSi alloy containing 5 to 13 wt % Si.

12. Strip according to claim 9, having, in a condition after brazing, a microstructure of elongated grains with a form factor F>2.

13. Strip according to claim 9, having, in a condition after brazing, a microstructure of approximately equiaxial grains.

14. Method of manufacturing a strip according to claim 12, comprising the steps of casting a plate of said aluminum alloy, hot rolling the cast plate without prior homogenization, cold rolling the hot rolled plate to a desired thickness, and recovery annealing of the cold rolled plate at a temperature of 250 to 300° C.

15. Method of manufacturing a strip according to claim 13, comprising the steps of casting of said alluminum alloy, homogenizing said plate between 590 and 630° C., hot rolling the homogenized plate, cold rolling the hot rolled plate to a desired thickness, and a final annealing at a temperature of 320 to 380° C.

16. Strip for the manufacture of a brazed heat exchanger, comprising an aluminum alloy consisting essentially of, in % by weight:
Si: 0.15–0.30;
Fe: <0.25;
Cu: 0.2–1.1;
Mn: 1.0–1.4;
Mg: <0.4;
Zn: <0.2;
Ti: <0.1;
other elements: each <0.05 and total <0.15; and
Al: remainder;
wherein Fe≦Si, and Cu+Mg>0.4,
said strip having, in a condition after brazing, a microstructure of elongated grains with a form factor F>2.

17. Strip according to claim 16, wherein said alloy contains, by weight, 0.2–0.6% Cu and 0.1 to 0.4% Mg.

18. Method of manufacturing a strip according to claim 16, comprising the steps of casting a plate of said aluminum alloy, hot rolling the cast plate without prior homogenization, cold rolling the hot rolled plate to a desired thickness, and recovery annealing of the cold rolled plate at a temperature of 250 to 300° C.

19. Strip for the manufacture of a brazed heat exchanger, comprising an aluminum alloy consisting essentially of, in % by weight:
Si: 0.15–0.30;
Fe: <0.25;
Cu: 0.2–1.1;
Mn: 1.0–1.4;
Mg: <0.4;
Zn: <0.2;
Ti: <0.1;
other elements: each <0.05 and total <0.15; and
Al: remainder;
wherein Fe≦Si, and Cu+Mg>0.4,
said strip having, in a condition after brazing, a microstructure of approximately equiaxial grains.

20. Strip according to claim 19, wherein said alloy contains, by weight, 0.2–0.6% Cu and 0.1 to 0.4% Mg.

21. Method of manufacturing a strip according to claim 19, comprising the steps of casting a plate of said aluminum alloy, homogenizing said plate between 590 to 630° C., hot rolling the homogenized plate, cold rolling the hot rolled plate to a desired thickness, and a final annealing at a temperature of 320 to 380° C.

* * * * *